(12) United States Patent
Bernard

(10) Patent No.: US 12,703,481 B2
(45) Date of Patent: Aug. 11, 2026

(54) ROTOR POSITION CONTROL SYSTEM

(71) Applicant: Textron Innovations Inc., Providence, RI (US)

(72) Inventor: Guy Bernard, Kirkland (CA)

(73) Assignee: Textron Innovations Inc., Providence, RI (US)

( * ) Notice: Subject to any disclaimer, the term of this patent is extended or adjusted under 35 U.S.C. 154(b) by 0 days.

(21) Appl. No.: 18/171,976

(22) Filed: Feb. 21, 2023

(65) Prior Publication Data

US 2024/0278909 A1 Aug. 22, 2024

(51) Int. Cl.

| | |
|---|---|
| ***B64C 27/52*** | (2006.01) |
| ***B64C 27/28*** | (2006.01) |
| ***B64C 27/57*** | (2006.01) |
| ***B64C 29/02*** | (2006.01) |
| ***B64D 35/08*** | (2025.01) |

(52) U.S. Cl.
CPC .............. *B64C 27/52* (2013.01); *B64C 27/28* (2013.01); *B64C 27/57* (2013.01); *B64C 29/02* (2013.01); *B64D 35/08* (2013.01)

(58) Field of Classification Search
CPC ..... B64C 27/30; B64C 11/325; B64C 11/385; B64C 29/0025; B64D 35/021
See application file for complete search history.

(56) References Cited

U.S. PATENT DOCUMENTS

| | | | | |
|---|---|---|---|---|
| 2011/0024555 | A1* | 2/2011 | Kuhn, Jr. | B64C 29/0033 244/17.11 |
| 2016/0046369 | A1* | 2/2016 | Watkins | B64C 27/24 244/7 A |
| 2017/0260872 | A1* | 9/2017 | Munevar | F01D 21/006 |
| 2018/0118335 | A1* | 5/2018 | Gamble | H02K 11/21 |
| 2021/0245873 | A1* | 8/2021 | Tighe | B64C 5/02 |
| 2021/0253234 | A1* | 8/2021 | Tao | B64C 29/0025 |
| 2023/0406490 | A1* | 12/2023 | Roach | B64U 30/20 |

* cited by examiner

*Primary Examiner* — Ashesh Dangol
(74) *Attorney, Agent, or Firm* — Lightfoot & Alford PLLC

(57) ABSTRACT

An tiltrotor aircraft includes a rotor position control system (RPCS). The RPCS includes an electric motor configured to selectively rotate the rotor blade, a target marker kinematically associated with the rotor blade, a sensor configured to sense a position of the target marker, and a flight control computer configured to selectively control the electric motor in a normal mode of operation in which the rotor blade provides thrust and a phase lock mode of operation in which the electric motor maintains the rotor blade in a predetermined indexed position.

16 Claims, 10 Drawing Sheets

ROTOR POSITION CONTROL SYSTEM

BACKGROUND

The present disclosure relates in general to controlling angular positioning of a rotor and associated rotor blades. More specifically, the present disclosure relates to novel systems and methods for actively moving rotors to selected low aerodynamic drag positions when not in use to provide thrust. The apparatus of the present disclosure is well suited for use in the field of aircraft, in particular, tiltrotor aircraft. Conventional systems for controlling rotor position have utilized specialized mechanical components that add to the overall weight of the aircraft and present additional maintenance requirements.

DETAILED DESCRIPTION

In this disclosure, reference may be made to the spatial relationships between various components and to the spatial orientation of various aspects of components as the devices are depicted in the attached drawings. However, as will be recognized by those skilled in the art after a complete reading of this disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction. In addition, the use of the term "coupled" throughout this disclosure may mean directly or indirectly connected, moreover, "coupled" may also mean permanently or removably connected, unless otherwise stated.

This disclosure contemplates a variety of tiltrotor aircraft comprising rotor position control systems associated with some of the rotors. In accordance with features of embodiments described herein, the drive system includes one or more fixed electric motors coupled to an off-axis tilting gearbox. The tilting configuration may have a motor attached to a drive system for reduction of rpm or the motor itself may be direct drive directly turning the prop at the desired speed. Tilting of the rotor assemblies can take place with respect to the stationary motors and wing or other stationary structure of the aircraft. The motors or motors with drive may tilt with the rotors/props or the motor may remain stationary with the prop and a portion of the drive rotating. Tilting may occur with a portion of the attached wing or boom or the wing or boom may stay fixed with only the pylon tilting.

Figure 1A:
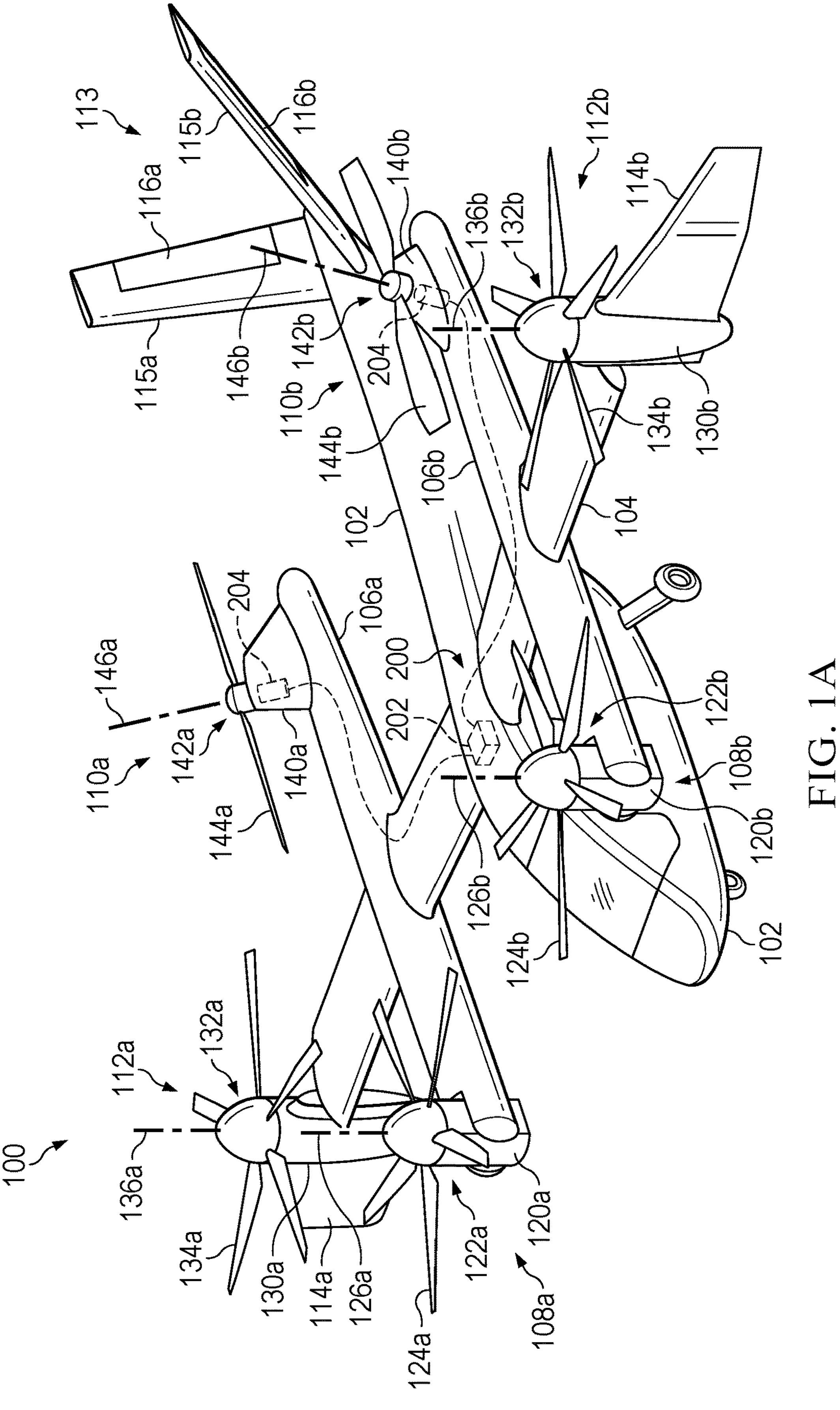
FIG. 1A is an oblique view of a tiltrotor aircraft according to the present disclosure in a hover mode.

The tilting pylons in certain ones of the following illustrative example include forward tilting pylon on a boom and typically aft rotors above or below the boom. The wing tip rotor may tilt with a portion of the wing rotating with it (as shown in FIG. 1A). When rotating with the rotating pylon, all of the wing or any percentage of the wing may rotate. Allowing the wing to rotate minimizes download in hover mode due to impingement of the rotor stream on exposed airframe/wing surfaces, reducing net rotor lift and power required in hover.

Figure 1B:
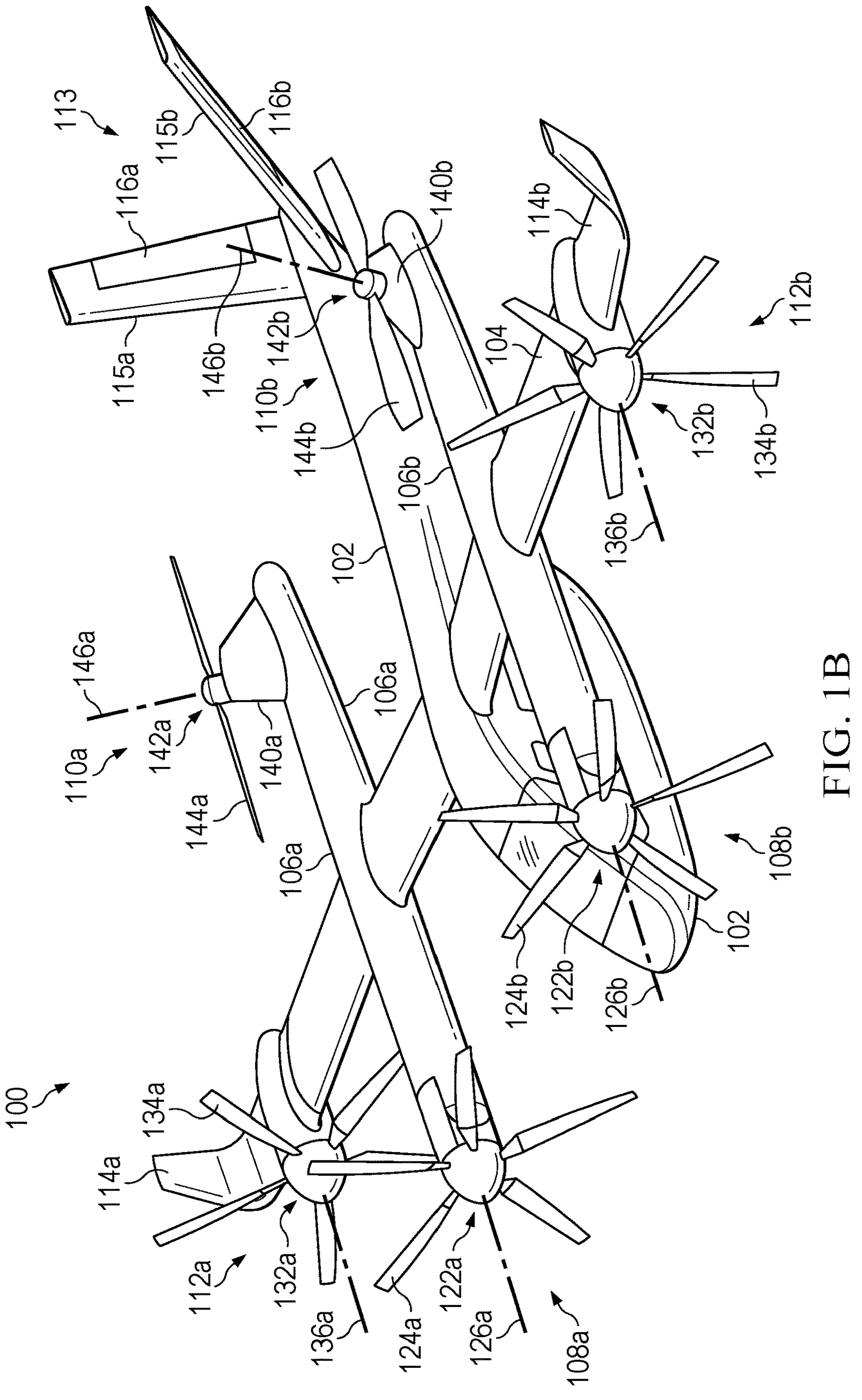
FIG. 1B is an oblique view of the aircraft of FIG. 1A in an airplane mode.
Figure 1C:
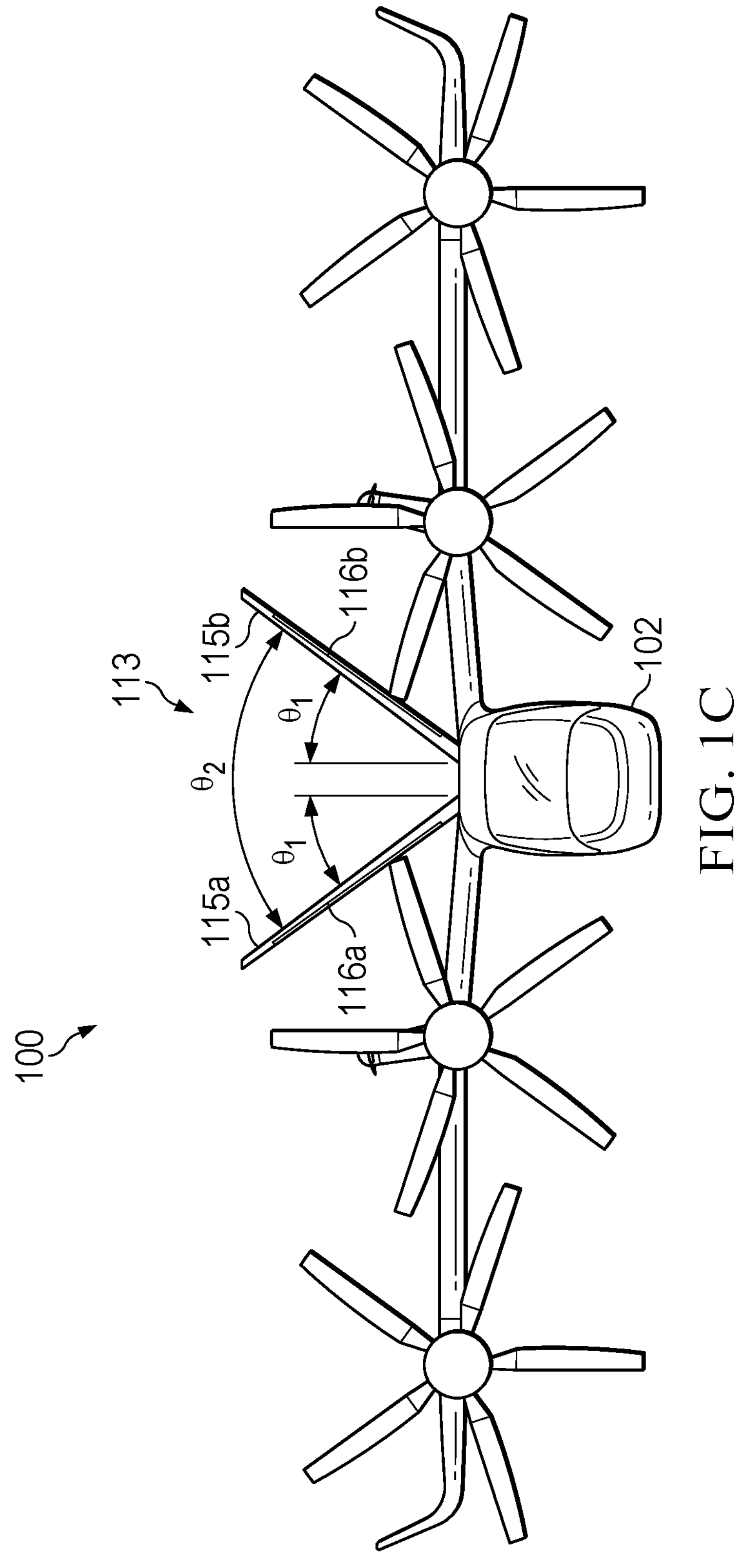
FIG. 1C is a front view of the aircraft of FIG. 1A in the airplane mode.

FIGS. 1A-1C illustrate an example tiltrotor aircraft 100 that is convertible between a VTOL or hover (also commonly referred to as helicopter) mode (shown in FIG. 1A), which allows for vertical takeoff and landing, hovering, and low speed directional movement, and a cruise (also commonly referred to as airplane) mode (shown in FIG. 1B), which allows for forward flight as well as horizontal takeoff and landing. Aircraft 100 includes a fuselage 102, wing 104, and booms 106*a*, 106*b*, connected to the wing on opposite sides of the fuselage 102. In accordance with features of embodiments described herein, aircraft further includes three pairs of propulsion systems, including forward propulsion systems 108*a*, 108*b*, adjacent to the forward end of the fuselage 102, aft propulsion systems 110*a*, 110*b*, adjacent to the aft end of the fuselage 102, and a pair of wing-mounted propulsion systems 112*a*, 112*b*, proximate opposite tips of wing 104. In the illustrated embodiment, forward propulsion systems 108*a*, 108*b*, are attached to forward ends of booms 106*a*, 106*b*, respectively, and aft propulsion systems 110*a*, 110*b*, are attached to booms 106*a*, 106*b*, respectively, proximate aft ends thereof. Aft propulsion systems 110*a*, 110*b* are disposed aft of wing 104.

Aircraft 100 further includes a tail assembly 113 at an aft end thereof. In the embodiment illustrated in FIGS. 1A-1C, the tail assembly 113 is disposed on the aft end of the fuselage 102 and comprises a V-tail configuration including a pair of airfoils 115*a*, 115*b*, which extend from the top surface of the fuselage 102 at the aft end thereof. As best shown in FIG. 1C, airfoils 115*a*, 115*b*, each extend outboard at an angle $\Theta_1$ from vertical, where an absolute value of the angle $\Theta_1$ is less than 90 degrees. Airfoils 115*a*, 115*b*, form an angle $\Theta_2$ with one another. Although as illustrated herein, the tail assembly 113 comprises a dihedral, or upward, V-tail, it will be recognized that in alternative embodiments, the tail assembly may comprise an anhedral, or downward, V-tail. In particular embodiments, angle $\Theta_2$ may be between 30 degrees and 330 degrees. Control surfaces 116*a*, 116*b*, are disposed on trailing edges of airfoils 115*a*, 115*b*, and may be implemented as "ruddervators" for providing yaw and pitch control in certain embodiments. In certain embodiments, each of the control surfaces 116*a*, 116*b*, may comprise multiple independently controllable segments.

In the illustrated embodiment, each forward propulsion system 108*a*, 108*b*, includes a drive system housing comprising a pylon 120*a*, 120*b*, and a rotatable open rotor assembly 122*a*, 122*b*, comprising a plurality of rotor blades 124*a*, 124*b*, connected to a rotor mast and configured to rotate about a rotor axis 126*a*, 126*b*. As shown in FIGS. 1A and 1B, each rotor assembly 122*a*, 122*b*, includes five (5) rotor blades; however, it should be recognized that more or fewer blades may be implemented without departing from the spirit and the scope of the embodiments described. Rotation of rotor blades 124*a*, 124*b*, about rotor axis 126*a*, 126*b*, generates lift while operating in helicopter mode and thrust while operating in airplane mode. Each pylon 120*a*, 120*b*, may house one or more electric motors therein configured to produce rotational energy that drives the rotation of rotor assembly 122*a*, 122*b*. Alternatively, each pylon 120*a*, 120*b*, may house a gearbox therein that drives the rotation of rotor assembly 122*a*, 122*b*, wherein the gearbox receives rotational energy from a driveshaft or gear. The driveshaft may be driven remotely by an electric motor located some distance away or may be directly coupled to electric motor.

In the illustrated embodiment, each wing-mounted propulsion system 112*a*, 112*b*, includes a drive system housing comprising a pylon 130*a*, 130*b*, and a rotatable open rotor assembly 132*a*, 132*b*, comprising a plurality of rotor blades 134*a*, 134*b*, connected to a rotor mast and configured to rotate about a rotor axis 136*a*, 136*b*. As shown in FIGS. 1A and 1B, each rotor assembly 132*a*, 132*b*, includes five (5) rotor blades; however, it should be recognized that more or fewer blades may be implemented without departing from the spirit and the scope of the embodiments described. It should also be recognized that rotor assemblies 132*a*, 132*b*, may include a different number of rotor blades than rotor assemblies 122*a*, 122*b*. Rotation of rotor blades 134*a*, 134*b*, about rotor axis 136*a*, 136*b*, generates lift while operating in helicopter mode and thrust while operating in airplane mode. Each pylon 130*a*, 130*b*, may house one or more electric motors therein configured to produce rotational energy that drives the rotation of rotor assembly 132*a*, 132*b*. Alternatively, each pylon 130*a*, 130*b*, may house a gearbox therein that drives the rotation of rotor assembly 132*a*, 132*b*, wherein the gearbox receives rotational energy from a driveshaft.

In the illustrated embodiment, each aft propulsion system 110*a*, 110*b*, includes a drive system housing comprising a pylon 140*a*, 140*b*, and a rotatable open rotor assembly 142*a*, 142*b*, comprising a plurality of rotor blades 144*a*, 144*b*, connected to a rotor mast and configured to rotate about a rotor axis 146*a*, 146*b*. As shown in FIGS. 1A and 1B, each rotor assembly 142*a*, 142*b*, includes two (2) rotor blades; however, it should be recognized that more or fewer blades on a single or stacked rotor may be implemented without departing from the spirit and the scope of the embodiments described. Rotation of rotor blades 144*a*, 144*b*, about rotor axis 146*a*, 146*b*, generates lift while operating in helicopter mode. While operating in cruise mode, the rotor blades 144*a*, 144*b*, may cease rotation or be caused to rotate in a minimum power state. Each pylon 140*a*, 140*b*, may house one or more electric motors therein configured to produce rotational energy that drives the rotation of rotor assembly 142*a*, 142*b*. It will be recognized that while rotor assemblies 142*a*, 142*b*, are illustrated as being disposed above (i.e., on top of) booms 104*a*, 104*b*, they may alternatively be disposed below (i.e., on the underside of) booms and the distance from rotor to boom may vary or there may be rotor above and below the pylon as yet another alternative.

The fairings of pylons 140*a*, 140*b*, are designed to reduce the rotor-boom noise. In particular, there are two parameters that influence the acoustics of rotors over booms, including the relative width W of the boom surface (narrow is better than wide) and the ratio of the height of the rotor h to the rotor radius R (the higher the better). The fairings function to elevate the rotor above the boom, thereby to increase h/R and lower the acoustic impact of the rotor over the boom, and to cover the mast to prevent the elevated rotor from being overly penalizing in drag, as the fairing has lower drag than an exposed mast. The fairing is also much narrower (lower relative W) than original boom as well, which provides additional acoustic advantages.

In accordance with features of embodiments described herein, and as illustrated in FIGS. 1A and 1B, wing-mounted propulsion systems 112*a*, 112*b*, are connected to inboard ends of wing tips, or winglets, 114*a*, 114*b*, attached to outboard ends of wing 104. In certain embodiments, wing tips 114*a*, 114*b*, may be canted, while in other embodiments, wing tips 114*a*, 114*b*, extend in substantially the same plane as wing 104. In some embodiments, wing tips 114*a*, 114*b*, may be omitted. Wing tips 114*a*, 114*b*, together with wing-mounted propulsion systems 112*a*, 112*b*, tilt relative to wing 104 between a first position (FIG. 1A), in which propulsion systems 112*a*, 112*b*, and wing tips 114*a*, 114*b*, are configured in a hover mode, and a second position (FIG. 1B), in which propulsion systems 112*a*, 112*b*, and wing tips 114*a*, 114*b*, are configured in a cruise mode. In some embodiments, the wing 104 may carry through under the pylons such that wing tips 114*a*, 114*b* remain fixed with the wing 104 as the propulsion systems 112*a*, 112*b* tilt. Similarly, forward propulsion systems 108*a*, 108*b*, (and more specifically, pylons 120*a*, 120*b*) are connected in a tiltable manner to forward ends of booms 106*a*, 106*b*, such that they may be tilted between a first position (FIG. 1A), in which propulsion systems 108*a*, 108*b*, are configured in a hover mode, and a second position (FIG. 1B), in which propulsion systems 108*a*, 108*b*, are configured in a cruise mode. In accordance with features of embodiments described herein, aft propulsion systems 110*a*, 110*b*, are fixedly attached to booms 106*a*, 106*b*, proximate aft ends thereof and do not convert between hover mode (FIG. 1A) and cruise mode (FIG. 1B). However, as explained below, rotor assemblies 142*a*, 142*b* can be controlled to maintain a desired substantially stationary angular position that is selected as a function of the mode of operation aircraft is operating in, such as hover, cruise, or a transition mode therebetween.

The position of rotor assemblies 122*a*, 122*b*, 132*a*, 132*b*, as well as the pitch of individual rotor blades 124*a*, 124*b*, 134*a*, 134*b*, 144*a*, 144*b*, can be selectively controlled in order to selectively control direction, thrust, and lift of aircraft 100. As previously noted, propulsion systems 108*a*, 108*b*, 112*a*, 112*b*, are each convertible, relative to fuselage 102, between a vertical position, as shown in FIG. 1A, and a horizontal position, as shown in FIG. 1B. Propulsion systems 108*a*, 108*b*, 112*a*, 112*b*, are in the vertical position during vertical takeoff and landing mode. Vertical takeoff and landing mode may be considered to include hover operations of aircraft 100. Propulsion systems 108*a*, 108*b*, 112*a*, 112*b*, are in the horizontal position during forward flight mode, in which aircraft 100 is in forward flight. In forward flight mode, propulsion systems 108*a*, 108*b*, 112*a*, 112*b*, direct their respective thrusts in the aft direction to propel aircraft 100 forward. Aircraft 100 is operable to fly in all directions during the vertical takeoff and landing mode configuration of FIG. 1A, although faster forward flight is achievable while in the forward flight mode configuration of FIG. 1B. Propulsion systems 108*a*, 108*b*, 112*a*, 112*b*, may be tiltable between the vertical and horizontal positions by actuators (not shown) that are tiltable in response to commands originating from a pilot and/or a flight control system. Each of the propulsion systems 108*a*, 108*b*, 110*a*, 110*b*, 112*a*, 112*b*, may utilize an electric motor and gearbox unit disposed within a respective pylon 120*a*, 120*b*, 130*a*, 130*b*, 140*a*, 140*b* or a direct drive motor of group of motors on the same shaft as a power source to rotate the respective rotor assembly 122*a*, 122*b*, 132*a*, 132*b*, 142*a*, 142*b*, about rotor axis 126*a*, 126*b*, 136*a*, 136*b*, 146*a*, 146*b*, via a rotor mast.

It should be noted that, although propulsion systems 108*a*, 108*b*, are shown and described as being tiltable between cruise and hover positions, those propulsion systems may be fixed in the hover positions, similarly to propulsion systems 110*a*, 110*b*. Additionally and/or alternatively, propulsion systems 112*a*, 112*b*, may be connected to opposite ends of wing 104 such that only pylons 130*a*, 130*b*, or a portion thereof, are tiltable relative to wing 104. The tiltable pylons 130*a*, 130*b* and 108*a* and 108*b* may also be differentially tiltable and may vary in power to control yaw of the aircraft whereas different thrust for roll and pitch is controlled through differential blade pitch, rpm, and motor power.

In accordance with features of embodiments described herein, rotor assemblies 142*a*, 142*b*, may controlled to cease rotation while other rotor assemblies continue to rotate. In embodiments in which propulsion systems 108*a*, 108*b*, are also fixed (i.e., do not convert between hover and cruise modes), rotor assemblies 122*a*, 122*b*, may also cease rotation when aircraft 100 is in cruise mode. Fewer active rotor assemblies in cruise mode improves propulsive efficiency of the aircraft. In addition, stopping the aft rotors avoids ingestion of the wakes from the forward rotors, which would make the aft rotors less efficient. With six rotor assemblies, a rotor assembly can be lost while still allowing aircraft 100 to hover even without motor redundancy per rotor assembly. In the event of a rotor failure, the rotor on the opposite side of the aircraft can be powered down, allowing the aircraft to hover as a quad copter with the four remaining rotors operating at elevated power levels. In accordance with features of embodiments described herein, if the aft left rotor were to fail, the forward right rotor would also be powered down, allowing the thrust on the remaining rotors to balance. Electric power to the motors allows the distributed nature of the aircraft 100 to stay weight efficient without requiring extensive cross-connects.

Figure 2:
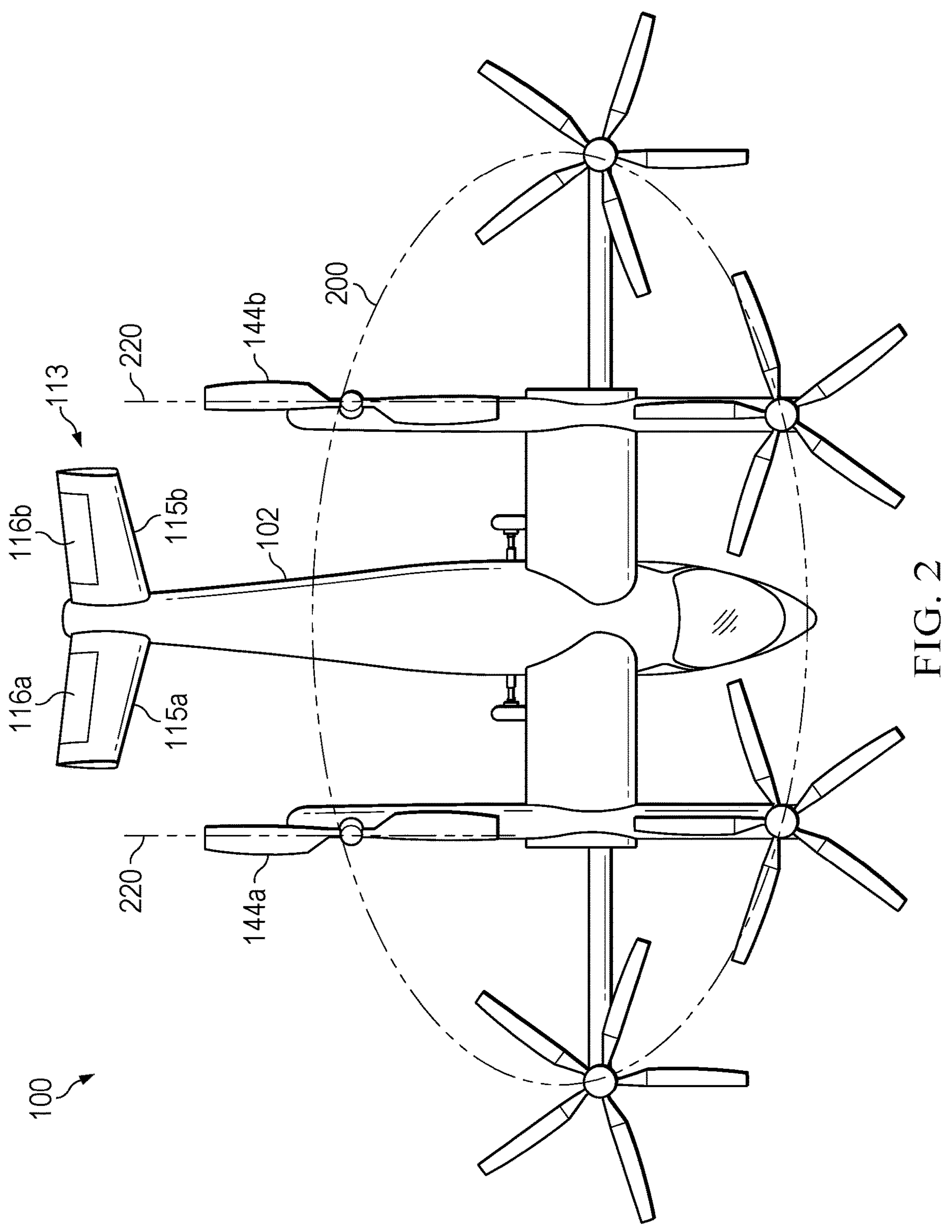
FIG. 2 is a top view of the aircraft of FIG. 1A in the hover mode.
Figure 3:
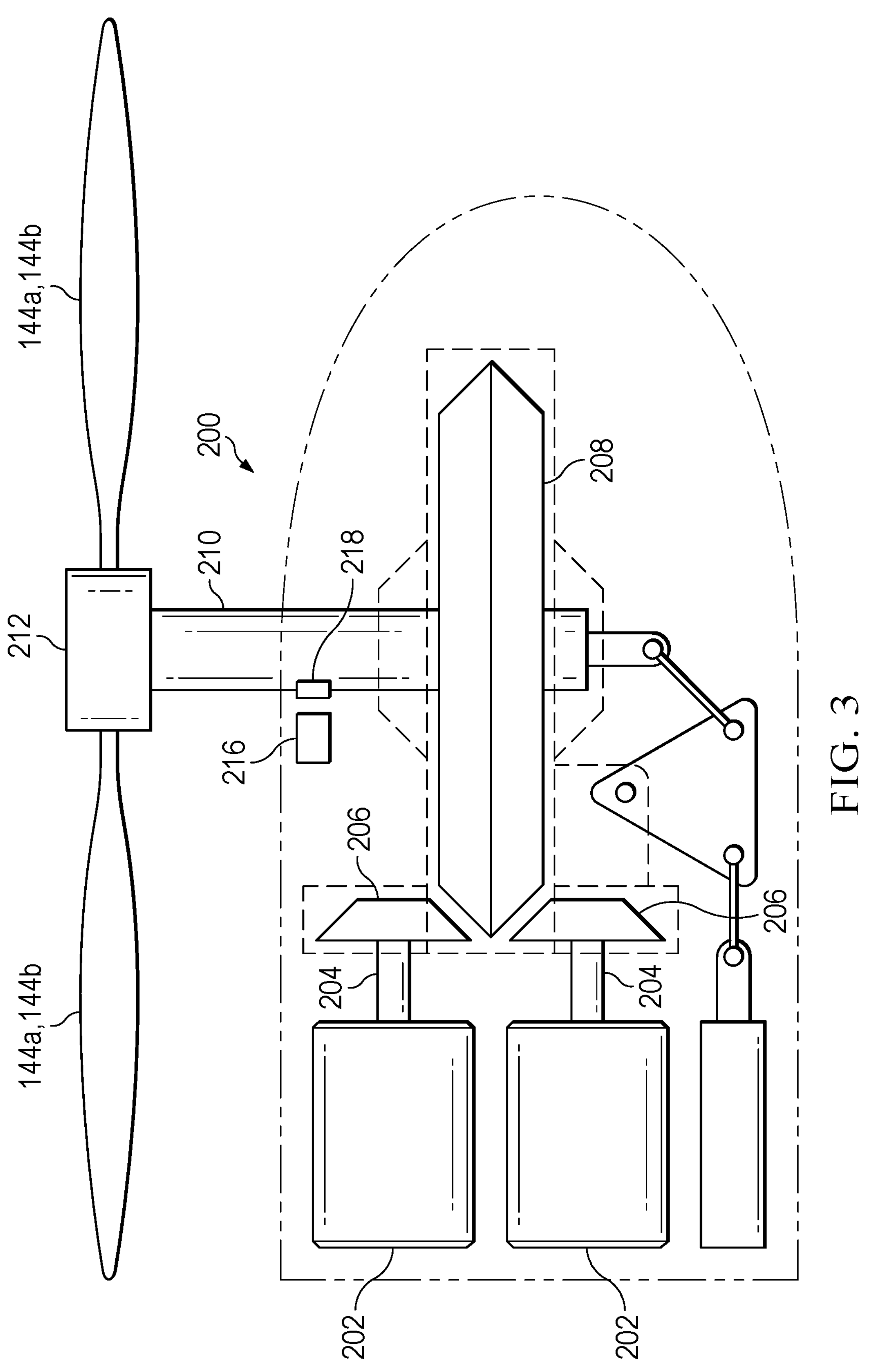
FIG. 3 is a schematic view of a portion of a rotor position control system (RPCS) according to the present disclosure.
Figure 4:
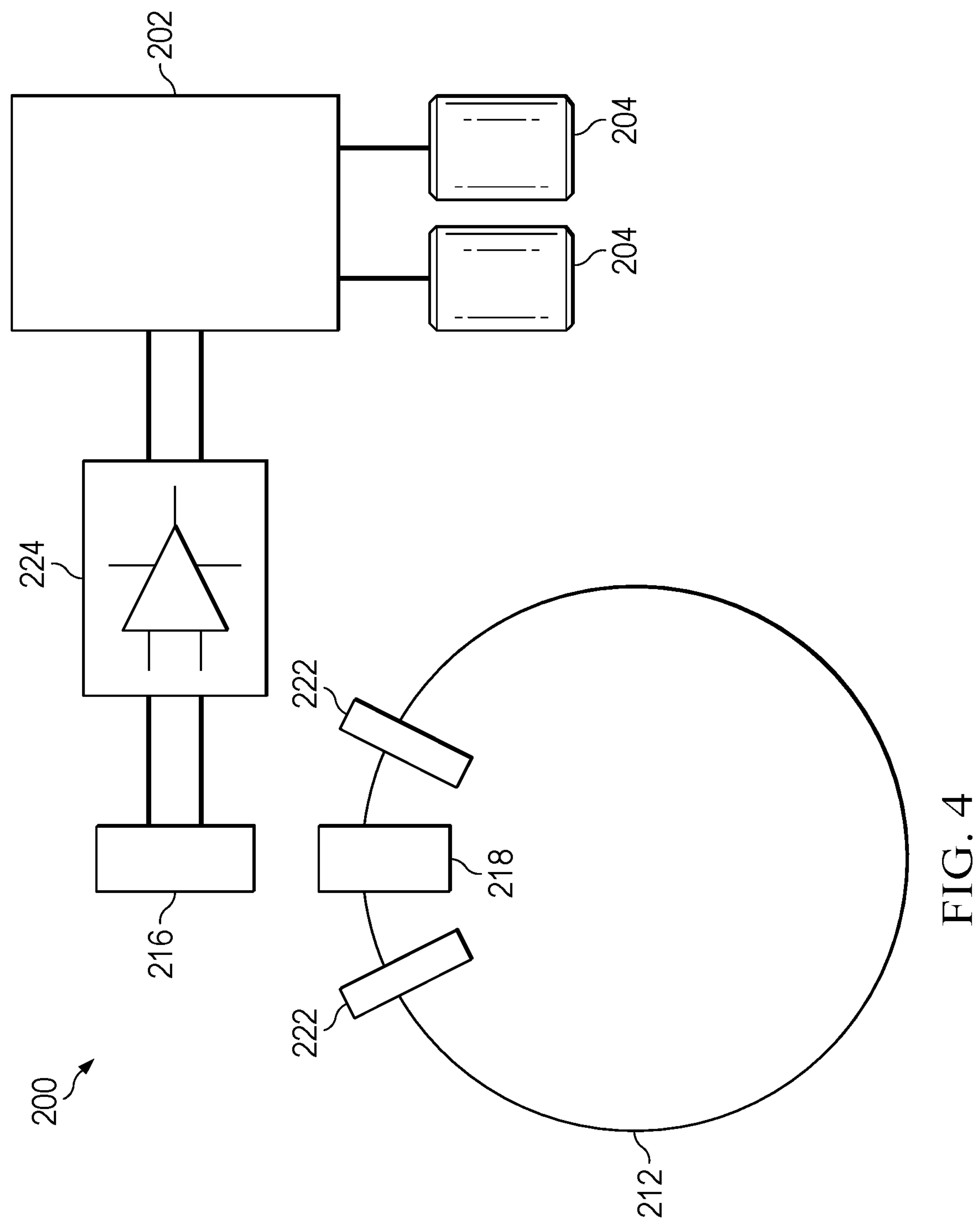
FIG. 4 is another schematic view of a portion of the RPCS of FIG. 3.

Referring now to FIGS. 3 and 4, a rotor position control system (RPCS) 200 is shown. RPCS 200 comprises a flight control computer (FCC) 202, motors 204 having motor shafts 206, motor gears 208 attached to motor shafts 208, and a rotor gear 210. In this embodiment, having multiple motors 204 provides redundancy. Motor gears 208 engage with rotor gear 210 to rotate the rotor gear 210 and the attached rotor shaft 212. A rotor hub 214 is carried by rotor shaft 212 and rotor blades 144*a*, 144*b* can be carried by rotor hub 214. The rotor blades 144*a*, 144*b* are in fixed angular positions relative to rotor hub 214, rotor shaft 212, and rotor gear 210. Accordingly, knowing a position of any of the motors 204, motor shaft 206, motor gear 208, rotor gear 210, rotor shaft 212, rotor hub 214, and/or rotor blades 144 can indicate a position of any of the other kinematically connected components. In this embodiment, a proximity sensor 216 is disposed to sense proximity of a target marker 218 that is carried by the rotor shaft 212. The sensor 216 is connected to FCC 202 so that FCC 202 can be informed when target marker 218 is in a predetermined indexed position relative to the sensor 216. When target marker 218 is in the predetermined indexed position, in this embodiment, it is known that rotor blades 144 are oriented to be in a least drag position for forward flight of aircraft 100. More specifically, in the predetermined indexed position, blades 144 extend substantially fore and aft along a fore-aft direction of aircraft 100 as indicated by lines 220 as shown in FIG. 2. In some embodiments, approach markers 220 can be located angularly adjacent target marker 218 to provide additional positional information to FCC 202. Further, additional electronics 224 can be disposed between sensor 216 and be configured to monitor electrical pulses generated by passage of markers 218, 220 relative to sensor 216 and provide signals to FCC 202.

In this embodiment, an instruction from FCC 202 to change aircraft 100 mode from hover to either a transition mode or aircraft mode can be used so trigger changing motor 204 operation from a normal mode in which sufficient power is applied to generate thrust to a phase lock mode in which motor 204 speed is gradually slowed and then ultimately stopped with target marker 218 in the predetermined indexed position to located blades 144 as shown in FIG. 2. In this embodiment, cogging torque level resistance combined with the gearing resistance can be sufficient to maintain the prop aligned with its support boom during airplane mode flight. In some cases power can be applied to motors 204 at a much lower level than that used to generate thrust and the small amount of power applied to motors 204 in combination with the mechanical resistance of the drive train can maintain the rotor alignment shown in FIG. 2. In some embodiments, sensors 216 can comprise a proximity sensor (such as a Hall effect or magneto-resistive sensor) can be carried in the boom and disposed relative to the rotor shaft 212 so that reliable amplitudes of electrical pulses can be evaluated by the electronics 224 and reported to the FCC 202. In some cases, an algorithm akin to what is commonly used on car engine crankshaft can be used to detect rotor shaft 212 position. In some cases during phase lock, a small level of electric current is adequate to generate a motor cogging torque needed to balance the aerodynamic and inertial forces acting on the rotor system. In some cases, if motor 204 positions creep away from the reference locations that ensure the predetermined indexed position, such as due to intense in-flight vibration or wind gusts, FCC 202 can detect the motion via an motor 204 internal position sensor, step-increase the motor phase lock current for each motor rotation away from "reference" and re-position motor after a set amount of time, such as 10 seconds. In some cases, the motors 204 comprise step motors and associated controllers capable of internally monitor motor position and reorienting motor position accurately, and hence, reorienting blades 144 accurately.

Figure 5:
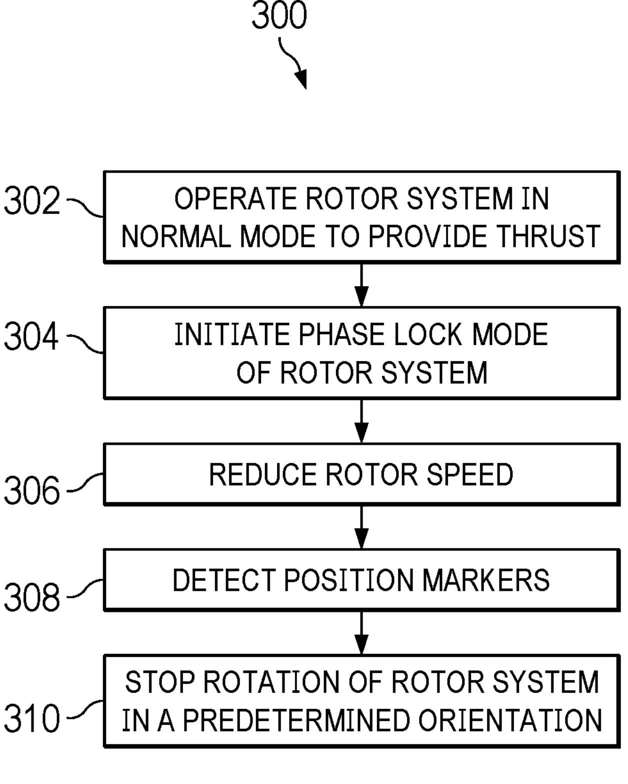
FIG. 5 is a flowchart of a method of operating the RPCS of FIG. 3.

Referring now to FIG. 5, a method 300 of operating RPCS 200 is shown. Method 300 can begin at block 302 by operating the rotor system in normal mode with motors being operated in normal mode to provide thrust. Next, at block 304, a phase lock mode of operating rotor system can be initiated and thus operation of motors in a phase lock mode can begin. At block 306, an initial stage of phase lock mode can be achieved by reducing rotor speed. At block 308, FCC 202 can detect marker 218, 222 positions can be detected by electronics 224 and reported to FCC 202. At block 310, when rotor speed is sufficiently reduced, a low amount of power can be applied to motors 204, such as an amount of power insufficient to generate thrust, to cause alignment of the rotor system to the predetermined indexed position as shown in FIG. 2, with the blades 144 stopped in alignment with the boom. While in some cases no power is required to keep the predetermined indexed position, power can be applied to motors continuously to additionally contribute to maintaining the predetermined indexed position.

Figure 6:
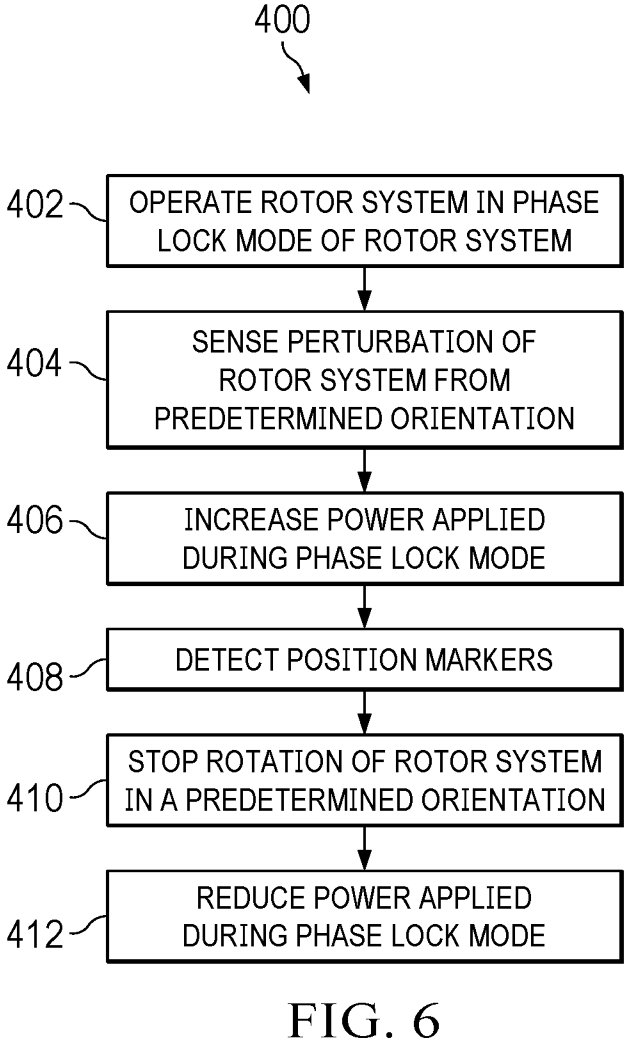
FIG. 6 is a flowchart of a method of operating the RPCS of FIG. 3.

Referring now to FIG. 6, a method 400 of operating RPCS 200 is shown. At block 402, RPCS 200 can be operated in the phase lock mode described above to maintain the predetermined index position. Next at block 404, RPCS 200 can sense perturbation of the rotor system from the predetermined indexed position. At block 406, in response to the sensed movement, RPCS 200 can increase power applied to motors during the phase lock mode in a stepwise manner to once again return the rotor system to the predetermined indexed position. In some cases, the power applied can be a function of the amount of angular offset the rotor system experienced, with more power being applied to the motors in response to larger angular movements from the predetermined indexed position. At block 408, once the RPCS 200 determines a return to the predetermined index position by detecting the position markers, at block 410 the rotor system movement can be stopped an held at the predetermined indexed position. At block 412 with the rotor system in the predetermined indexed position, power supplied to the motors can be reduces or fully discontinued.

Figure 7:
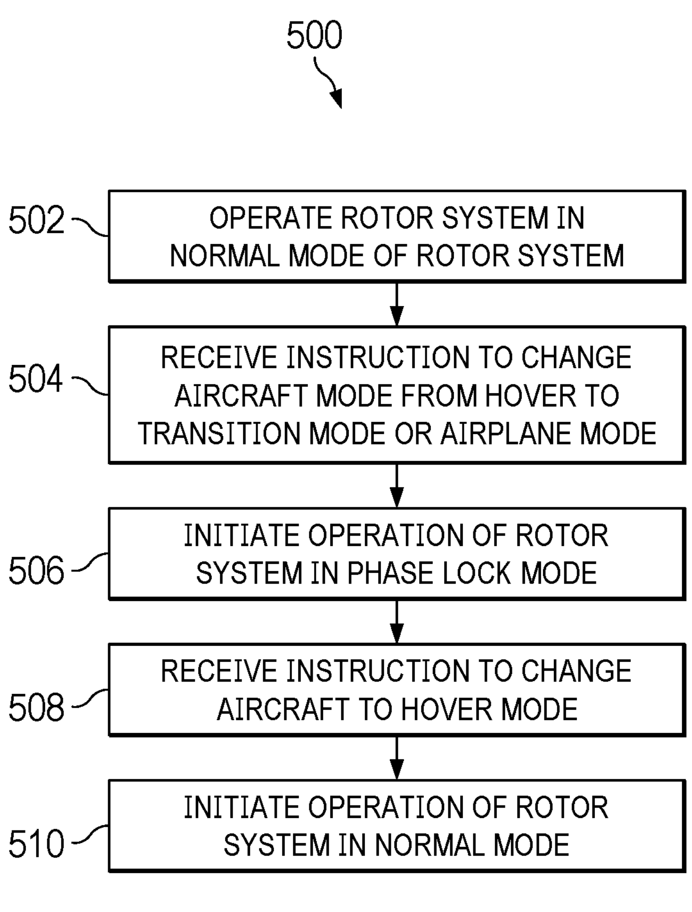
FIG. 7 is a flowchart of a method of operating the RPCS of FIG. 3.

Referring now to FIG. 7, a method 500 of operating RPCS 200 is shown. In some embodiments, at block 502 RPCS 200 can operate with motors in the normal mode with the rotor system rotating to provide thrust. Next at block 504, RPCS 200 can sense a command from the FCC 202 to change operation of aircraft 100 from the hover mode to the airplane mode or to a transition mode between hover mode and airplane mode. Next at block 506, in response to receiving the instruction to discontinue hover mode, RPCS 200 can initiate phase lock mode in which the rotor system is slowed down, stopped, and maintained in the predetermined indexed position as shown in FIG. 2. Next at block 508, RPCS 200 can sense a command to resume hover mode. At block 510, RPCS 200 can, in response to receiving the instruction to resume hover mode, begin to operate rotor system and RPCS 200 in normal mode so that rotor system again provide thrust.

Figure 8:
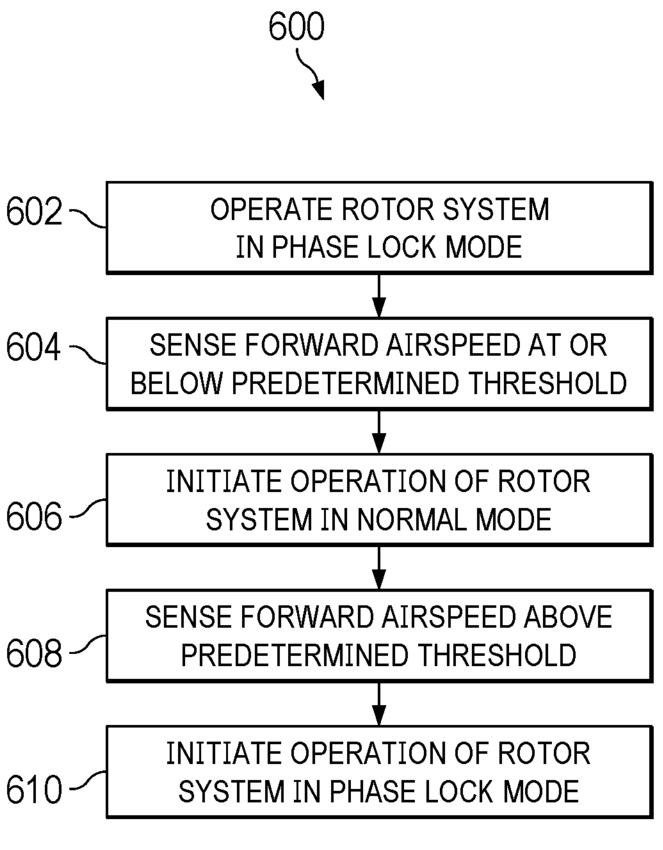
FIG. 8 is a flowchart of a method of operating the RPCS of FIG. 3.

Referring now to FIG. 8, a method 600 of operating RPCS 200 is shown. In some embodiments, at block 602 RPCS 200 can operate with motors in the phase lock mode with the rotor system locked in the predetermined indexed position by RPCS 200. Next at block 604, RPCS 200 can receive information about a forward airspeed being at or below a predetermined threshold from the FCC 202. At block 606, in response to the lowered airspeed, RPCS 200 can begin to operate in the normal mode to control motors to provide thrust. Next at block 608, RPCS 200 can receive information about a forward airspeed being above the predetermined threshold from the FCC 202. Next at block 610, in response to receiving information about the increased forward airspeed, the RPCS 200 can initiate operation of the phase lock mode to slow the rotor system and ultimately keep the rotor system in the predetermined indexed position as shown in FIG. 2.

It will be appreciated that any suitable motors (such as stepper motors), motor controllers, electronics, sensors, algorithms and flight characteristic inputs can be utilized to effectuate the methods disclosed herein. Further, it will be appreciated that while the predetermined indexed position in FIG. 2 is suitable for forward flight, in alternative embodiment, other predetermined indexed position of rotor systems and blade can be achieved and maintained, such as for use in sustained aircraft maneuvers that can benefit from different maintained positions of rotor blades where such positions. Still further, it will be appreciated that preset controlling of applied power to motors can be administered by RPCS 200 to achieve and maintain rotor blade positioning while utilizing a least amount of power necessary to achieve the positional requirement, thereby improving overall efficiency of aircraft power and fuel.

At least one embodiment is disclosed, and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, Rl, and an upper limit, Ru, is disclosed, any number falling within the range is specifically disclosed. In particular, the following numbers within the range are specifically disclosed: R=Rl+k*(Ru−Rl), wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 95 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention. Also, the phrases "at least one of A, B, and C" and "A and/or B and/or C" should each be interpreted to include only A, only B, only C, or any combination of A, B, and C.

What is claimed is:

1. A rotor position control system (RPCS), comprising:

a rotor blade;

an electric motor configured to selectively rotate the rotor blade to provide thrust;

a target marker kinematically associated with the rotor blade;

a sensor configured to sense a position of the target marker; and a flight control computer configured to selectively control the electric motor in a normal mode of operation in which the rotor blade provides thrust and a phase lock mode of operation in which the electric motor is configured to, without using mechanical connections not used when the electric motor provides thrust, maintain the rotor blade in a predetermined indexed position by applying power to the electric motor while the rotor blade is stopped in the predetermined indexed position to prevent movement of the rotor blade from the predetermined indexed position;

wherein in response to the rotor blade being perturbed from the predetermined indexed position during the phase lock mode of operation, power is applied to the electric motor as a function of at least one of (1) passage of a predetermined amount of time and (2)

differentially as a function of an amount of angular offset of the rotor blade from the predetermined indexed position.

2. The RPCS of claim 1, wherein the electric motor is a stepper motor.

3. The RPCS of claim 1, wherein the target marker is carried by a rotor shaft that drives the rotor blade.

4. The RPCS of claim 1, wherein the target marker is carried by a rotor gear that drives the rotor blade.

5. The RPCS of claim 1, wherein the target marker is carried by a motor gear that drives the rotor blade.

6. The RPCS of claim 1, comprising a second electric motor.

7. The RPCS of claim 1, wherein the predetermined indexed position of the rotor blade is selected as a position of least aerodynamic drag.

8. A tiltrotor aircraft, comprising:

a rotor position control system (RPCS), comprising:

a rotor blade;

an electric motor configured to selectively rotate the rotor blade to provide thrust when the tiltrotor aircraft is operating in a helicopter mode of operation;

a target marker kinematically associated with the rotor blade;

a sensor configured to sense a position of the target marker; and a flight control computer configured to selectively control the electric motor in a normal mode of operation in which the rotor blade provides thrust and a phase lock mode of operation in which the electric motor is configured to, without using mechanical connections not used when the electric motor provides thrust, maintain the rotor blade in a predetermined indexed position by applying power to the electric motor while the rotor blade is stopped in the predetermined indexed position to prevent movement of the rotor blade from the predetermined indexed position;

wherein in response to the rotor blade being perturbed from the predetermined indexed position during the phase lock mode of operation, power is applied to the electric motor as a function of at least one of (1) passage of a predetermined amount of time and (2) differentially as a function of an amount of angular offset of the rotor blade from the predetermined indexed position.

9. The tiltrotor aircraft of claim 8, wherein the predetermined indexed position is a position in which the rotor blade is aligned in a substantially fore-aft direction.

10. A method of operating a tiltrotor aircraft, comprising:

providing a rotor system comprising a rotor blade;

providing an electric motor configured to selectively rotate the rotor blade about an axis of rotation to provide thrust when the tiltrotor aircraft is in a helicopter mode of operation;

switching operation of the electric motor from operating in a normal mode to drive the rotor blade to generate thrust to a phase lock mode of operation that stops rotation of the rotor blade in a predetermined indexed position;

wherein when the tiltrotor aircraft is in an airplane mode of operation and while the rotor blade is stopped in the predetermined indexed position and not providing thrust, applying power to the electric motor to, without using mechanical connections not used when the electric motor provides thrust, maintain the rotor blade in the predetermined indexed position so as to prevent movement of the rotor blade from the predetermined indexed position; and during the phase lock mode of operation, responding to the rotor blade being perturbed from the predetermined indexed position by applying power to the electric motor as a function of at least one of (1) passage of a predetermined amount of time and (2) differentially as a function of an amount of angular offset of the rotor blade from the predetermined indexed position.

11. The method of claim 10, wherein the power applied to the electric motor to keep the rotor blade in the predetermined indexed position is further selected as a function of a sensed perturbation of the rotor blade from the predetermined indexed position.

12. The method of claim 10, wherein the electric motor is switched from the normal mode to the phase lock mode in response to changing operation of the tiltrotor aircraft from the helicopter mode to the airplane mode.

13. The method of claim 10, wherein the electric motor is switched from the normal mode to the phase lock mode in response to changing operation of the tiltrotor aircraft from the helicopter mode to a transition mode.

14. The method of claim 10, wherein the electric motor is switched from the phase lock mode to the normal mode in response to changing operation of the tiltrotor aircraft from the airplane mode to the helicopter mode or to a transition mode.

15. The method of claim 10, wherein the electric motor is switched from the normal mode to the phase lock mode in response to a predetermined forward airspeed being achieved or exceeded.

16. The method of claim 10, wherein the electric motor is switched to the normal mode from the phase lock mode in response to a predetermined forward airspeed no longer being achieved or exceeded.

* * * * *